US008538799B2

(12) United States Patent
Haller et al.

(10) Patent No.: US 8,538,799 B2
(45) Date of Patent: Sep. 17, 2013

(54) SYSTEM FOR BUSINESS MONITORING IN VIRTUAL ORGANIZATIONS

(75) Inventors: Jochen Haller, Karlsruhe (DE); Philip A. Robinson, Karlsruhe (DE); Yuecel Karabulut, Karlsruhe (DE); Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 1769 days.

(21) Appl. No.: 11/479,103

(22) Filed: Jun. 30, 2006

(65) Prior Publication Data
US 2008/0004927 A1  Jan. 3, 2008

(51) Int. Cl.
*G06Q 10/00* (2012.01)
(52) U.S. Cl.
USPC .......................................... 705/7.38
(58) Field of Classification Search
USPC .......................... 705/7, 7.11, 7.38
See application file for complete search history.

(56) References Cited

U.S. PATENT DOCUMENTS

| 6,070,142 A * | 5/2000 | McDonough et al. ............. 705/7 |
| 2005/0010456 A1* | 1/2005 | Chang et al. ...................... 705/7 |
| 2005/0203784 A1* | 9/2005 | Rackham .......................... 705/7 |
| 2005/0256735 A1* | 11/2005 | Bayne ................................ 705/1 |
| 2006/0009991 A1* | 1/2006 | Jeng et al. ......................... 705/1 |
| 2006/0010195 A1* | 1/2006 | Mamou et al. ................. 709/203 |

OTHER PUBLICATIONS

Managing Virtual Organization with Contracts—By Janne Metso and Lea Kutvonen Department of Computer Science University of Helsinki, Finland.*
Oracle SOA software, 2005, http://www.soa.com/images/data_Oracle_Integration.pdf 2 pages.
Schubert et al. The Trustcom Conceptual Models VI, Release V6, Jul. 2005, p. 30 (3 pages).

* cited by examiner

*Primary Examiner* — Andre Boyce
*Assistant Examiner* — Ernest A Jackson
(74) *Attorney, Agent, or Firm* — Blakely, Sokoloff, Taylor & Zafman (57) ABSTRACT

A method and system to automatically monitor business collaborations. Collaboration participants can formally express obligations about their expected behavior during the collaboration in business terms, then automatically monitor processes carrying out the collaboration using the formulated obligations. The method and system extends existing service oriented monitoring standards and architecture, specifically, with additional business oriented metrics and plug-in components that allow the monitoring system to calculate business parameters from measurements of multiple services.

21 Claims, 8 Drawing Sheets

FIG. 4

SYSTEM FOR BUSINESS MONITORING IN VIRTUAL ORGANIZATIONS

FIELD OF THE INVENTION

An embodiment of this invention relates generally to the field of online collaboration and in particular, to a method and a system for monitoring business collaborations.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve common business objectives. Organizations are sharing services and resources across enterprise boundaries in order to undertake collaborative projects and offer services that could not be provided by individual organizations.

One particular way the Internet can benefit commerce is by facilitating Virtual Organizations (VOs). VOs are a concept for forming business collaborations. A consortium of more permanent business organizations may wish to temporarily join together to produce a product or provide a service together that they could not do as fast or as well separately. A traditional way to form a collaboration is for the participants to create a jointly owned legal entity. However, this may be unattractive since such entities can require substantial amount of resources, including resources to establish and maintain accounting for the joint entity and management staff to run the joint entity. VOs offer an attractive alternative since they are not legal entities, organized instead with contracts describing the business objectives of the collaboration and describing the roles and duties of the participants.

The participants in a VO usually want to integrate their processes to some degree to achieve the goals of the collaboration. Since today businesses have computerized many of their business processes, this means collaborating businesses must integrate computerized processes. Integration of the computerized business processes within a company is by itself a difficult and time-consuming project requiring highly skilled labor. Integration of processes between collaborating companies can be even more difficult, so much so that many collaborations may not be attempted due to the cost and time involved.

A growing array of technologies has emerged to help bridge the gaps between people, time and geography in such collaborative environments. One such group of technologies is known collectively as "Web Services." Web Services can facilitate VOs by automating the process of integration, reducing the cost of integration as well as the time required.

Web Services are a set of protocols and standards for conducting commerce over the World Wide Web. The goal for Web Services is to provide a means for software systems to automatically find each other and interact over the World Wide Web. Web Services are based on the Extensible Markup Language (XML). The XML schema is a set of rules for storing data hierarchically in data objects called documents. The XML standards describe how a computer system running an XML execution engine running should act when processing an XML document. Programmers can introduce data structures previously undefined by XML using compounds of existing data structures. These compound data structures can still be processed by a standard XML execution engine. Alternatively, programmers can introduce new language extensions based on XML, incorporating XML data structures as well as newly defined structures. These language extensions cannot be processed by standard XML execution engines, but require execution engines adapted to the language extension. Additionally, language extensions may be the basis for yet more new languages.

One part of the Web Services technology suite includes Web Services Choreography Description Language (WS-CDL), an XML-based language that facilitates the creation of documents describing business choreographies. WS-CDL facilitates collaboration between participants regardless of the supporting platform, programming model and security domain of the hosting environment.

Web Services Business Process Execution Language (BPEL) is frequently used in conjunction with WS-CDL. BPEL is an XML based language designed to provide a formal specification of business processes and business interaction protocols for automatic execution. BPEL operates at a lower level of abstraction than WS-CDL. A WS-CDL choreography, while not legally binding, is similar to a business contract in that it describes all the objectives to which the participants are committed. In contrast, a BPEL process is more like an operations manual for a particular department of a business (a role in WS-CDL terminology), describing the steps required to carry out objectives assigned to a single role in one participant's organization.

A BPEL process uses one or more service to carrying out the process's objectives. A "service" in the Web Services universe is a channel between two computers for the generation, manipulation and exchange of messages. Each service is defined indirectly, through the description of the service interface. Service interface descriptions may be written in Web Services Description Language (WSDL), another XML-based language. A service interface description describes the data types to be passed in messages, describes how to map data into messages, describes the operations that may be performed on the messages and describes the ports that messages may be sent through. The BPEL process specifies the sequence of invoking the operations described in a corresponding WSDL document. This sequence is not completely pre-determined, since a BPEL process has its own exception handling and can react to events from outside of its execution environment.

Once a set of processes have been integrated for a VO, the services provided by these processes need to be monitored to ensure that the goals of the VO are achieved. Existing web service monitoring systems can provide for monitoring the performance of single service invocations. The obligations that are monitored by such systems are typically in terms of the technical performance of an individual service. For example, an obligation by one of the participants to perform a data retrieval service within 3 milliseconds. Such monitoring requires a fairly detailed view of the collaboration. What is missing is a way to monitor the performance of the overall collaboration, with commitments made in terms of business performance, such as the cost incurred by all participants over the entire collaboration or the time required to perform activities that require services from more than one participant in the collaboration.

SUMMARY OF THE INVENTION

Several embodiments are described of a method and system for automatically monitoring collaborations of multiple independent organizations.

One embodiment of the invention includes a service level agreement (SLA) Sub-system and an SLA document. The SLA document is written in a formal language, describing obligations related to a collaboration in business terms. The description of each obligation includes a conditional expression that defines the state of the obligation. The conditional expression uses parameters for arguments. Each parameter is defined by a metric given in the SLA document. Each metric includes instructions for either measuring a property of one of the services related to the collaboration or for returning a value determined by a function using arguments that include other metrics. Business oriented metrics may be used to determine the state of business-oriented obligations. The SLA document also includes lists of actions, each set corresponding to a state of one of the obligations. The SLA Sub-system comprises a negotiator, a manager, a monitor, and an evaluator.

One embodiment of the invention includes a method that creates a formal description of a business collaboration using a choreography language. A document with this description is transformed into multiple executable process descriptions and corresponding service interface descriptions. Process engines deploy and execute the processes and service interfaces. In parallel with creating and deploying the processes, a service level agreement (SLA) document is written. This document is deployed and the specifications it contains are distributed to various components of the SLA Sub-System. Parameter values are determined according to metrics contained in the deployed SLA document. The parameter values are used in conditional expressions to determine the state of each of the obligations. The state of an obligation has a list of associated actions to be invoked if when the obligation is found in that state.

In some embodiments, components of the SLA Sub-system are extended with plug in modules that facilitate the processing of advanced business metrics and business oriented obligations. In some embodiments the plug-ins facilitate the monitoring of service interfaces at remote locations.

Another embodiment of the invention is a computerized system to carry out the steps of the above described method. Another embodiment of the invention is a machine readable medium comprising instructions which when executed by a machine, carry out the steps of the above described method. Yet another embodiment of the invention is a computer implemented method carrying out the steps of the above described method.

BRIEF DESCRIPTION OF THE DRAWINGS

An embodiment of the present invention is illustrated by way of example and not limitation in the figures of the accompanying drawings, in which like references indicate similar elements and in which.

DETAILED DESCRIPTION

A method and system for automatically monitoring collaborations of multiple independent organizations is described. In the following description, for purposes of explanation, numerous specific details are set forth in order to provide a thorough understanding of an embodiment of the present invention. It will be evident, however, to one skilled in the art that the present invention may be practiced without these specific details.

In the following description, collaborations are frequently described as "business collaborations." While profit making business are included in the types of organizations that engage in collaborations, the present invention is not limited to such collaborations and is applicable to collaborations of non-profit organizations as well and to a combinations of for-profit and non-profit organizations.

A collaboration should be formally described in order to facilitate automatic monitoring of the collaboration. In some embodiments of the invention, a collaboration may be formally described and modeled as a choreography. A choreography describes a peer-to-peer collaboration of multiple participants from a high-level, business viewpoint. A choreography describes the participants' publicly observable activities in a collaboration, while not revealing the private processes each participant uses to carry out those activities. A choreography specifies, among other things, the participants, the roles they support, the activities performed by each role, the interactions between roles, and the type of information the roles exchange during an interaction. In some embodiments, Web Services Choreography Description Language (WS-CDL), an XML-based language, is used to formally describe a choreography.

Figure 1:
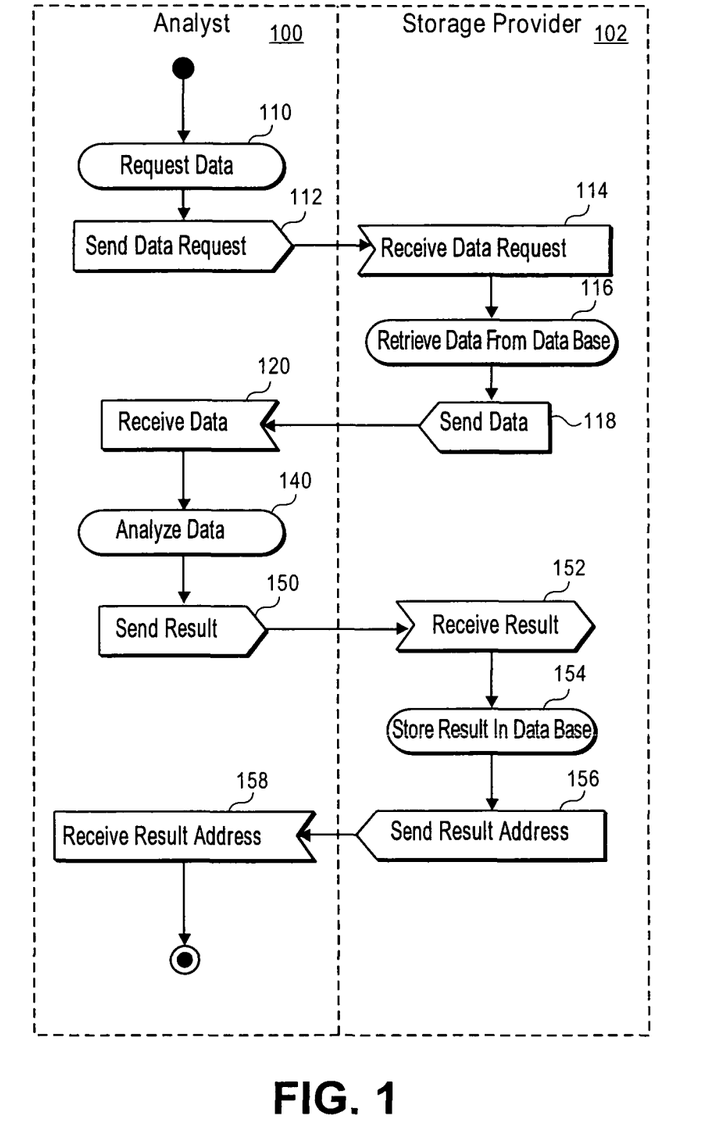
FIG. 1 shows an example collaboration modeled in a Unified Modeling Language (UML) activity diagram.

An example of a choreography, displayed in a Unified Modeling Language (UML) activity diagram, is shown is FIG. 1. The choreography depicted is part of a larger collaboration to design a car. The choreography shows the activities of the participants and the interaction between them. The participants are a car design company that offers a design analysis service and a storage service company that offers a data storage service for large amounts of data. As part of the collaboration, the design company must analyze large amounts of data, but the design company only has the capacity to store and analyze a small part of the total data at one time. The storage company's part of the collaboration is to provide storage for the raw data and for the results of the analysis. For this example, basic connectivity as well as security is assumed to have been established.

The design company has a role of Analyst 100 while the storage company has a role of Storage Provider 102. The primary activity of the Analyst 100 role is to Analyze Data 140. The data sets the Analyst 100 needs to analyze are stored with the Storage Provider 102. The Analyst 100 must first request the raw data from the Storage Provider 102 by sending the address for the data in the activity Send Request Data 112. The Storage Provider 102 performs the activity Receive Data Request 114 and receives the request. The Storage Provider 102 then performs the activity Retrieve Data from Data Base 116 and sends the retrieved raw data back to the Analyst 100 in the activity Send Data 118. After the Analyst 100 performs the activity Receive Data 120, it finally has the data to perform its primary activity Analyze Data 140. After the analysis of the data set is complete, the Analyst 100 sends the results of the analysis back to the Storage Provider 102 by performing the activity Send Result 150. Performing activity Receive Result 152, the Storage Provider 102 the stores the results by performing activity Store Results in Data Base 154. The Storage Provider 102 then sends the Analyst 100 the address where the results were stored in activity Send Results Address 156 and the Analyst 100 receives them in the activity Receive Result Address 158.

To ensure the objectives of the collaboration are achieved in a satisfactory manner, one or more of the participants may commit to certain obligations. Such obligations may include a requirement—an obligation to do a certain action in a certain way. Obligations may also include a constraint—an obligation to avoid doing a certain action or to avoid doing it in a certain way. Obligation may be technically oriented or business oriented. An example of a technically oriented obligation would be a Storage Provider 102 that agrees each retrieval of a 10 gigabyte block of data will be performed in less than 3 milliseconds while performing the activity Retrieve Data from Data Base 116. A first example of a business oriented obligation involves the execution time for a entire activity—the participant responsible for the role Analyst 100 is obligated to complete the activity Analyze Data 140 within 4 days of when the activity is started. A second example of a business oriented obligation involves the response time of an interaction between two roles—the participant responsible for the Analyst 100 and the participant responsible for the Storage Provider 102 role agree to be obligated to complete a specified interaction within 20 milliseconds. An interaction such as the Analyst 100 performing a Data Request 112 activity, and the Storage Provider 102 performing a Data Request 114 activity. A third example of a business oriented obligation regards the cost of the collaboration—the participants agree to limit the cost of the complete analysis of FIG. 1 to less than 3000€. A fourth example of a business oriented obligation regards ensuring costs remain within budget as the collaboration progresses—e.g. the participants agree that at any point in time during the collaboration, the fraction of the money spent divided by the budget allocated must not exceed the fraction of collaboration progress towards completion. E.g. if the collaboration is 60% complete, and only 40% of the budget has been spent, then the collaboration is within budget. However, if the collaboration is 60% complete, and 65% of the budget has been spent, then the collaboration is over budget.

Figure 3A:
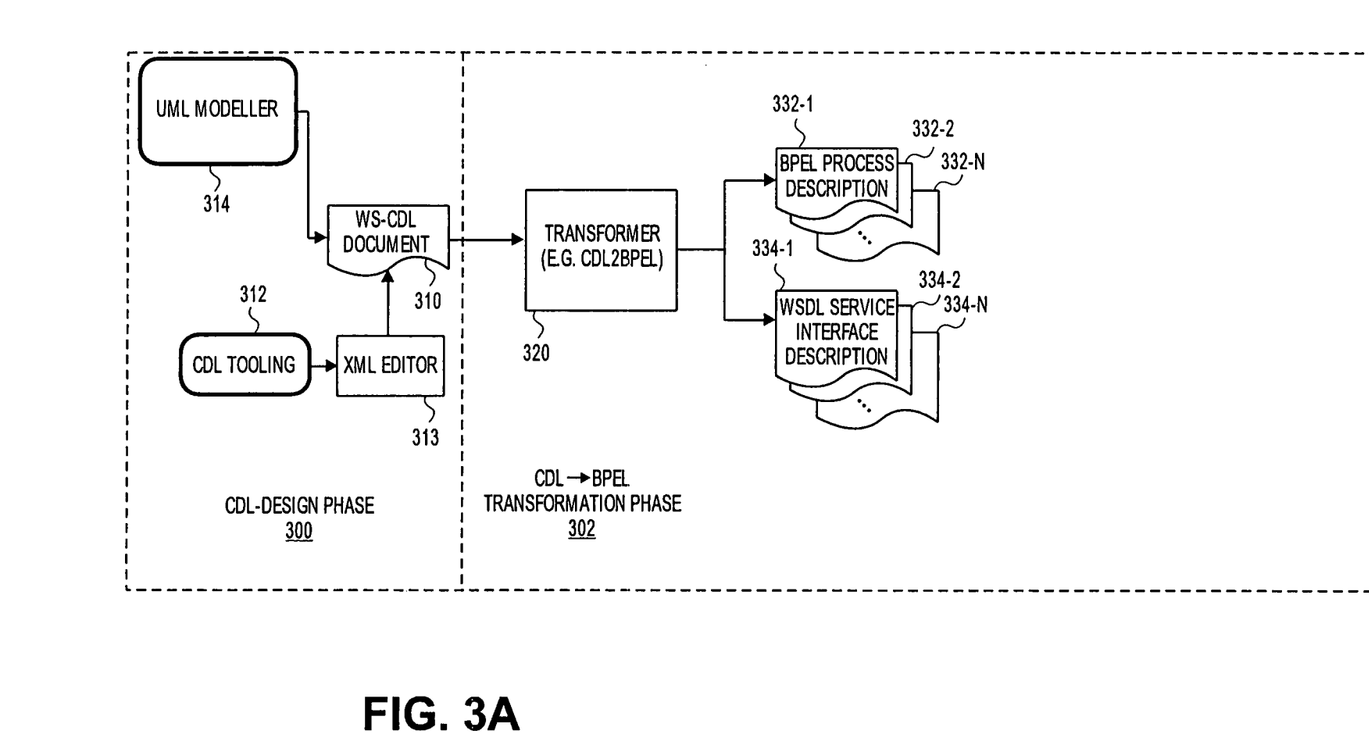
FIG. 3A shows the creation of a choreography document and shows its transformation into process description documents and service interface description documents in accordance with one exemplary embodiment of the invention.
Figure 3B:
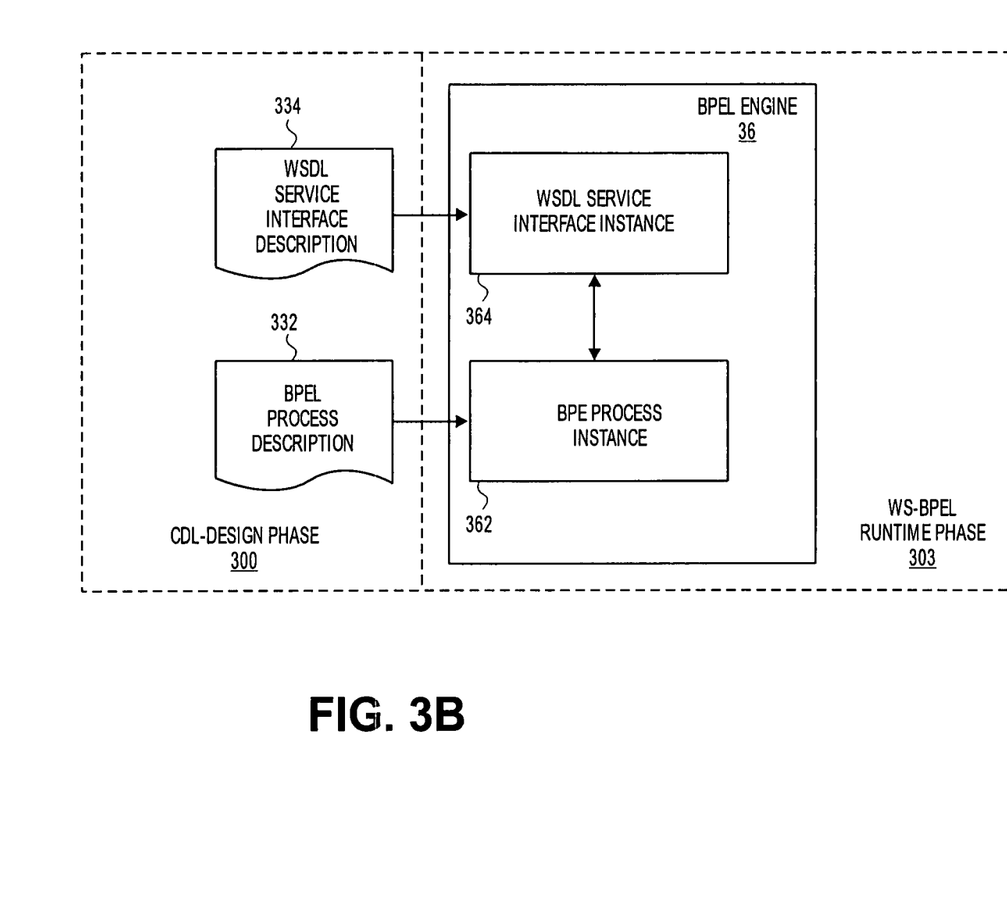
FIG. 3B shows the deployment and execution of a single process and associated service interface in accordance with one exemplary embodiment of the invention.
Figure 3C:
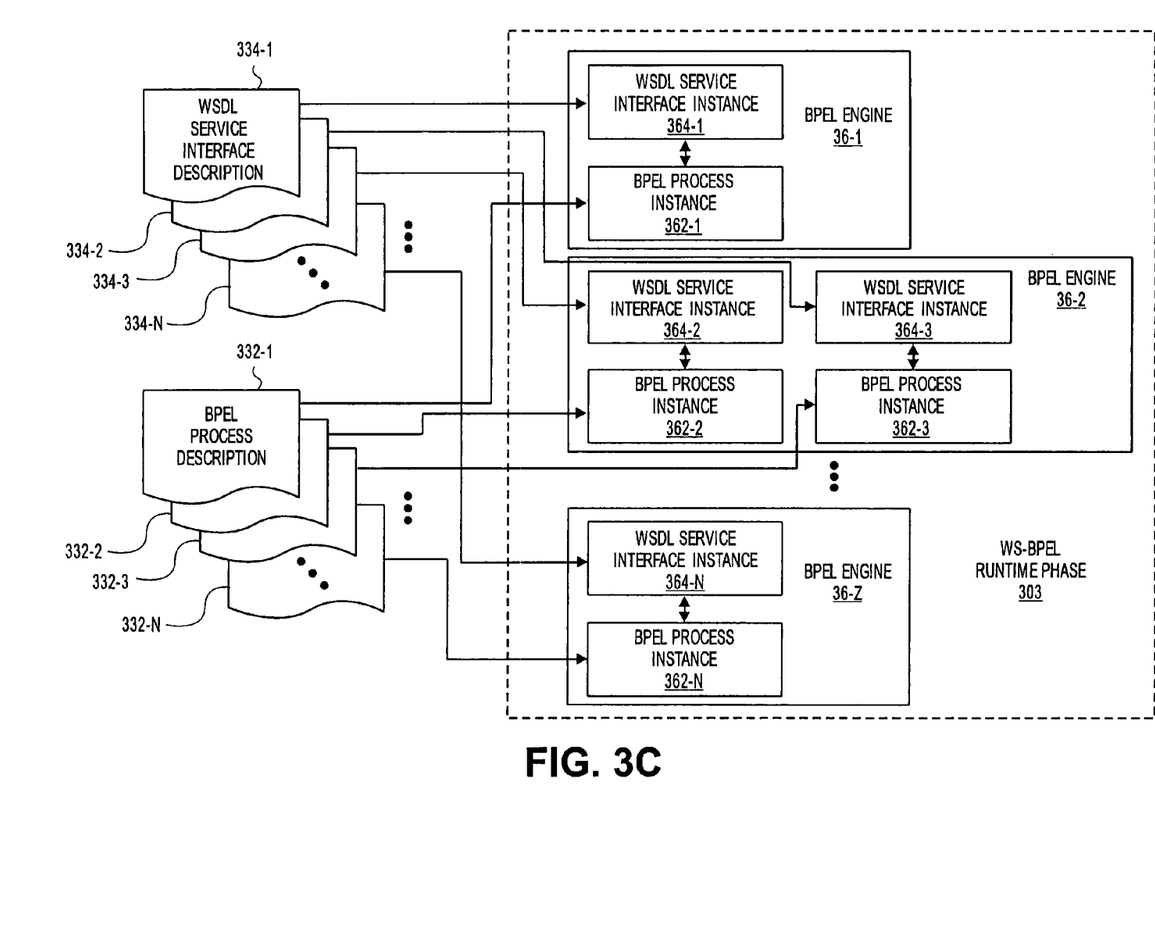
FIG. 3C shows the deployment and execution of multiple processes and associated service interfaces in accordance with one exemplary embodiment of the invention.
Figure 3D:
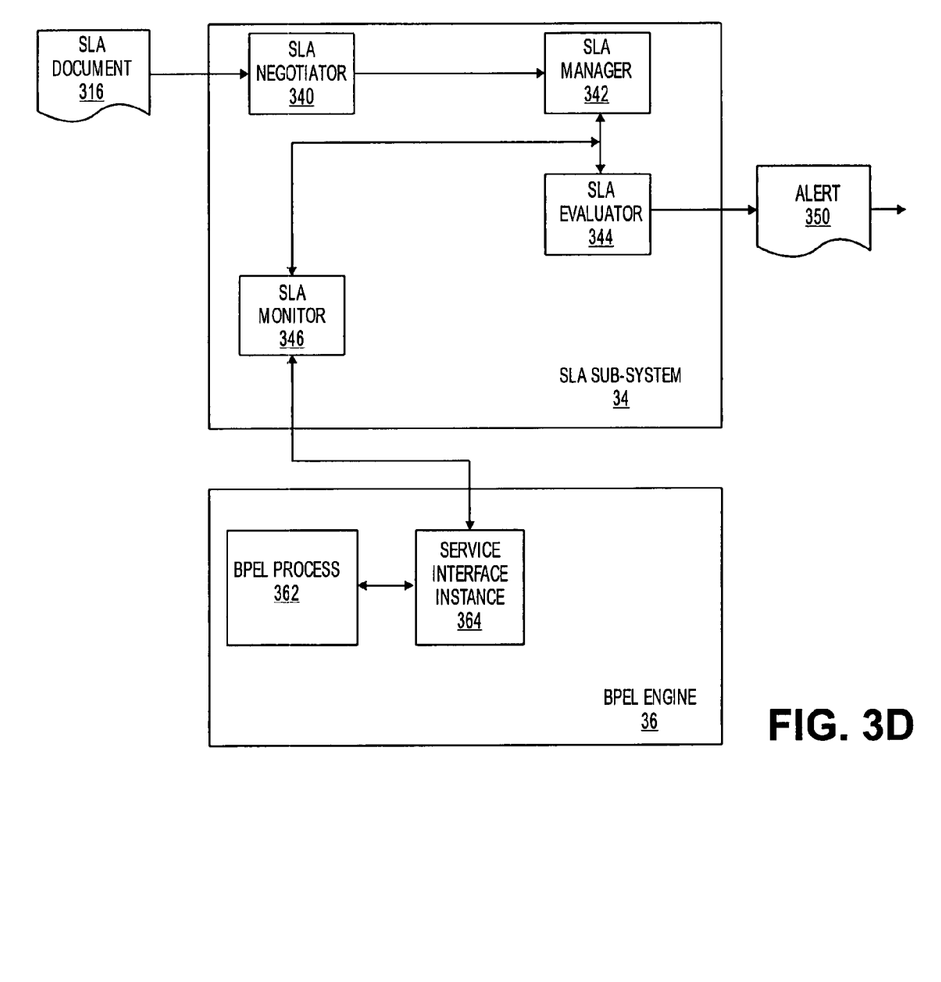
FIG. 3D shows one embodiment of a Service Level Agreement (SLA) Sub-system used to monitor business collaborations.

To ensure that collaboration obligations are met, in some embodiments of the invention the participants use a Service Level Agreement (SLA) Sub-system 34 similar to the one shown in FIG. 3D. In some embodiments, the SLA Sub-system 34 comprises an SLA Negotiator 340, an SLA Manager 342, an SLA Monitor 346 and an SLA Evaluator 344. In some embodiments, the SLA Sub-system 34 uses an SLA Document 316 as input. In one embodiment, the various components of the SLA Sub-system 34 are provided by a single participant. In other embodiments, some SLA Sub-system 34 components are provided by one participant and other components by a different participant. In yet another embodiment, some SLA Sub-system 34 components are provided by supporting third parties.

Figure 4:
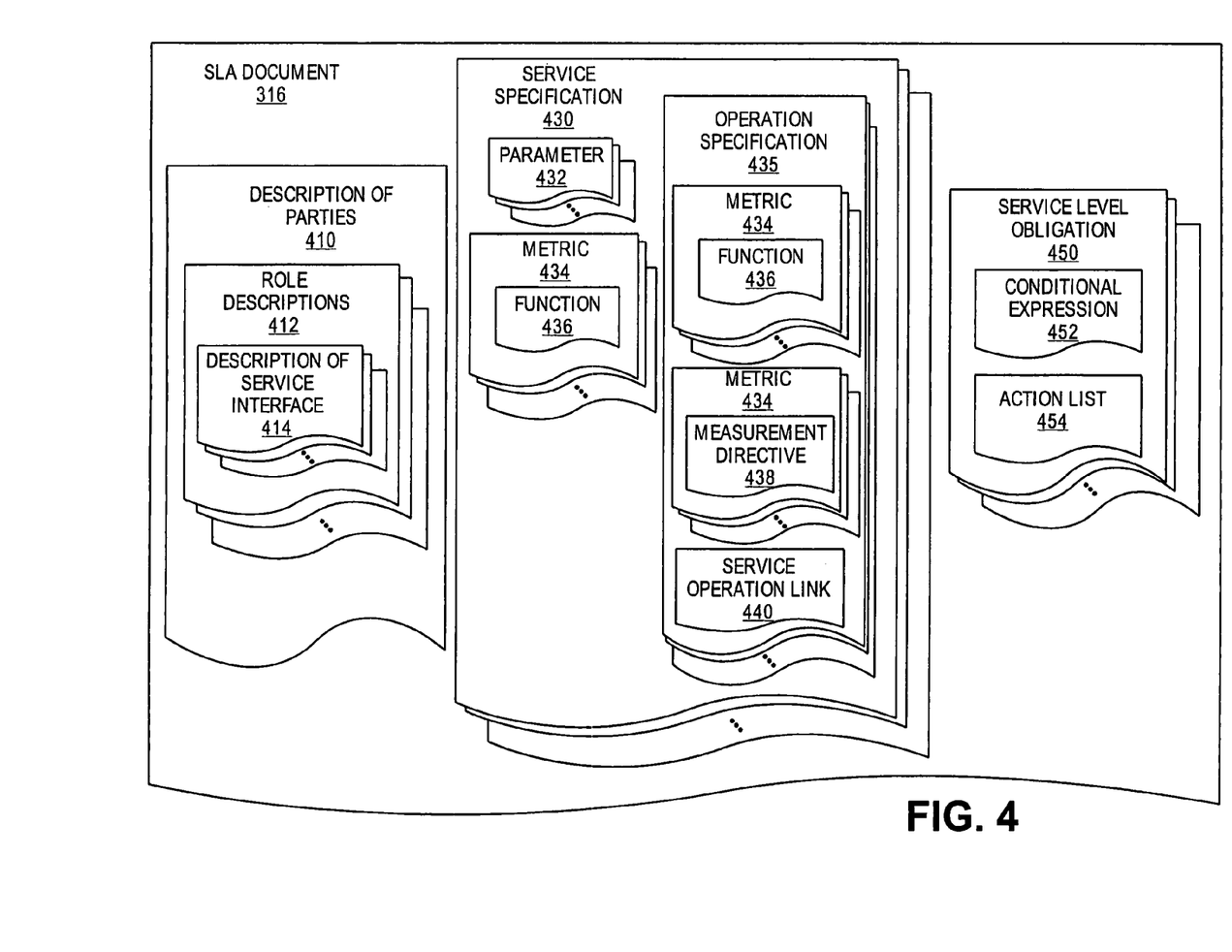
FIG. 4 shows the content of a Service Level Agreement (SLA) Document in accordance with one exemplary embodiment of the invention.

In some embodiments, the SLA Document 316 is written in a formal XML-based language. A formal language provides a structure and a vocabulary that enables automatic configuration of an SLA Sub-system 34. In some embodiments of the invention, a published standard such as Web Service Level Agreement (WSLA) language is used as the formal language. In other embodiments, extensions of WSLA are used. In yet other embodiments, a formal language not based on WSLA is used. As shown in FIG. 4, an SLA Document 316 structure includes a Description of the Parties 410, one or more Service Specifications 420, and one or more Service Level Obligations 430.

The Description of the Parties 410 includes one or more Role Description 412, each describing a role assumed by one of the participants or a role assumed by any supporting parties, such as a monitoring service. Each Role Description 412 may include one or more Action Description 414 that the party may called upon to perform based on the state of a Service Level Obligation 450.

A Service Specification 430 describes the information needed to determine the value of one or more Parameters (e.g. 432). A Service Specification 430 includes one or more Parameters (e.g. 432), each defined indirectly by a Metric 434. A Metric 434 may specify a Function 436 or a Measurement Directive 438 to be used to return a value. A Metric 434 also includes a description of the party responsible for determining the value of the Metric 434 and making it available to the SLA sub-system. A Function 436 describes taking another Function 436 or another Metric 434 as arguments and describes how to manipulate the arguments to obtain a result. A Measurement Directive 438 describes how to measure a property of a Service Interface Instance (e.g. 364-1). A Service Interface Instance (e.g. 364-1) is also referred herein as a "service interface." Any Metric 434 that includes a Measurement Directive 438 is bound with a Service Operation Link 440 that indicates the location of the Service Interface Instance (e.g. 364-1).

A Service Level Obligation 450 includes a formal Conditional Expression 452 and an Action List 454. The Conditional Expression 452 determines the state of the Service Level Obligation 450, whether it is in a state of fulfillment or in a state of violation. The Conditional Expression 452 may use Parameters 432 and constants as arguments. The Action List 454 corresponds to one state of the Service Level Obligation 450 and specifies actions to be taken when the Service Level Obligation 450 is in that particular state, as well as the party who is to undertake the action. Details of how to undertake a specific action are in a matching Action Description 414. For some obligation states, the list may be empty, with no actions to invoke.

An example of a business oriented obligation specified in an SLA Document is included in an Appendix hereto incorporated by reference.

Figure 3E:
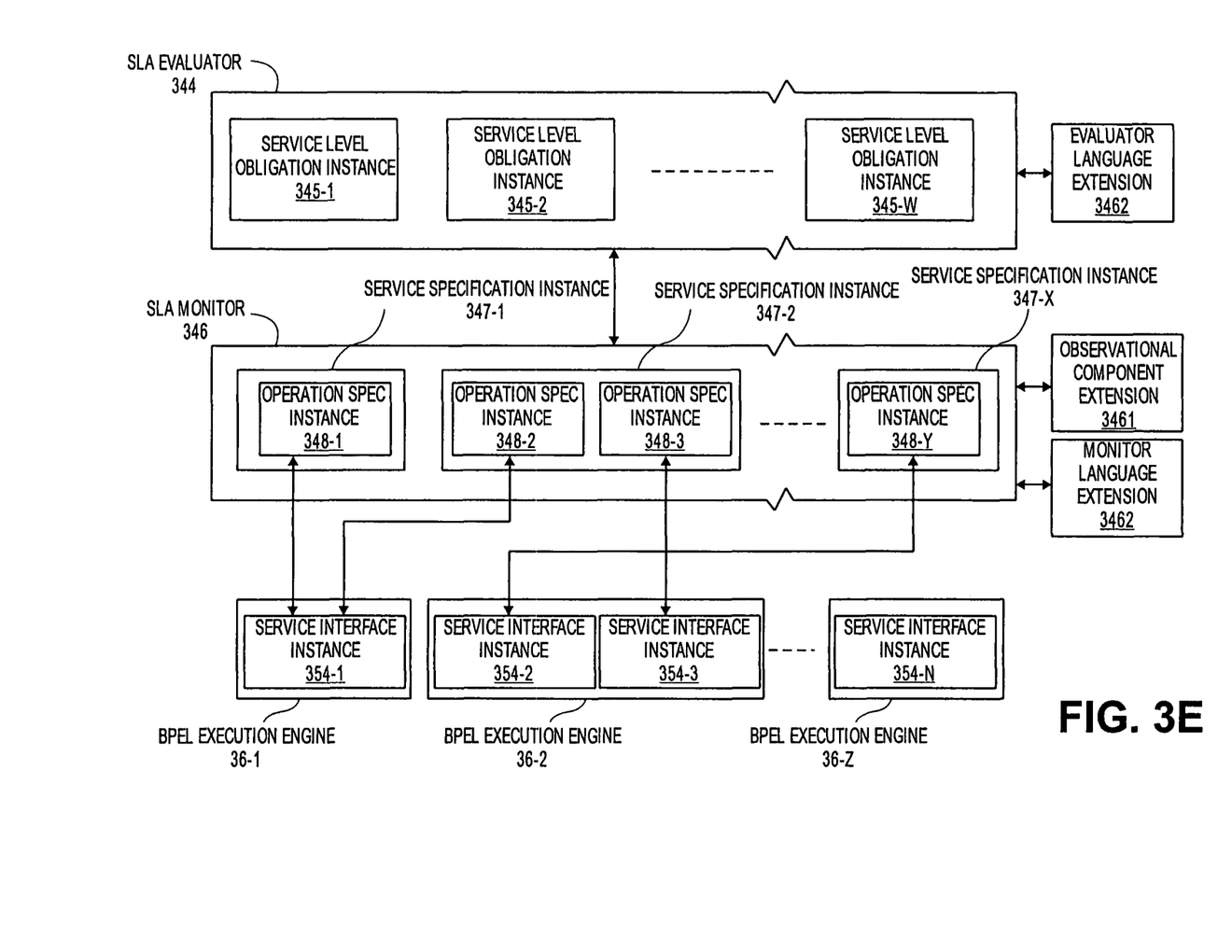
FIG. 3E shows a detailed view of one embodiment of the SLA Monitor and SLA Evaluator

FIG. 3E shows a detailed view of one embodiment of the SLA Monitor and SLA Evaluator. Some embodiments of an SLA Sub-system 34 include an SLA Negotiator 340. The SLA Negotiator 340 provides a facility to ensure that the participants to a collaboration agree to the terms of the SLA Document 316.

In some embodiments of the invention, an SLA Manager 342 provides facilities to receive and deploy SLA Documents 316. The SLA Manager's 342 deployment facility has the ability to configure a Service Specification 430 from the SLA Document 316 into an SLA Monitor 346, creating a Service Specification Instance (e.g. 347-1), incorporating all of the components of the Service Specification 430 in the Service Specification Instance (e.g. 347-1). In some embodiments of the invention, the SLA Manager 342 and the SLA Monitor 346 have the ability to create more than one Service Specification Instance (see e.g. 347-1, 347-2) in the SLA Monitor 346. The SLA Manager's 342 deployment facility also has the ability to configure a Service Level Obligation 450 into the SLA Evaluator 344 creating a Service Level Obligation Instance (e.g. 345-1), incorporating all of the components of the Service Level Obligation 450 in the Service Level Obligation Instance (e.g. 345-1). In some embodiments of the invention, the SLA Manager 342 and the SLA Evaluator 344 have the ability to create more than one Service Level Obligation Instance (see e.g. 345-1, 345-2) in the SLA Evaluator 344.

In some embodiments of the invention, the SLA Monitor 346 is the actual monitoring component of the SLA Sub-system 34. The SLA Monitor 346 has facilities to determine the values of the Parameters 432 included in the Service Specification Instances (e.g. 347-1) using the Metrics 434 also included in the Service Specification Instances (e.g. 347-1). Each Service Specification Instance (e.g. 347-1) includes at least one Operation Specification Instance (e.g. 348-1) that includes one or more Metric that includes a Measurement Directive 438 that provides instructions for measuring the properties of a linked Service Interface (e.g. 364-1). The Operation Specification Instance (e.g. 348-1) includes the endpoints (i.e. the address) of the Service Interface Instance (e.g. 354-1) linked to. A Service Specification Instance (e.g. 347-1) may include Functions (e.g. 436) and one or more Operation Specification Instance (e.g. 348-1) to determine the value of one or more Parameter 432. The SLA Monitor 346 has facilities to send messages about the value of Parameters (e.g. 432), to the SLA Manager 342 and SLA Evaluator 344.

In some embodiments of the invention, the SLA Evaluator 344 is the SLA Sub-system 34 component that knows about overall constraints. The SLA Evaluator 344 includes facilities to receive messages comprising Parameter 432 values from the SLA Monitor 346. A SLA Evaluator 344 configured with one or more Service Level Obligation Instance (e.g. 345-1) includes a Conditional Expression 452 and an Action List 454 for each Service Level Obligation Instance (e.g. 345-1). The SLA Evaluator 344 has facilities to take the Conditional Expression 452 and take the values of the Parameters (e.g. 432) it has received that are called for in the Conditional Expression 452 to determine the state of the Service Level Obligation Instance (e.g. 364-1). The SLA Evaluator 344 has facilities to invoke the actions in the Action List 454, if SLA Evaluator 344 finds the Service Level Obligation Instance (e.g. 364-1) in the state that the Action List 454 corresponds to.

In one embodiment of the invention, an Observational Component Extension 3461 to facilitate the SLA Monitor 346 in monitoring a Service Interface Instance (e.g. 364-1) that is at a location remote from the SLA Monitor 346. Such an Observational Component Extension 3461 can be realized as a "plug-in." Ganglia, a popular monitoring tool in the Grid community is one possible SLA Monitor that has flexible plug-in extensions. Following the fourth example of a business oriented obligation based on FIG. 1 discussed above, such a plug-in would allow the SLA Monitor 346 to track the current collaboration cost based on consumed services. Such a tracking can technically be implemented by requesting service consumption records from the financial or billing systems of the participants even if they are remote and dispersed.

In one embodiment of the invention, the basic SLA Sub-system 34 may be extended with a Monitor Language Extension 3462 to further facilitate the monitoring of business obligations. In other embodiments, a basic SLA Monitor may only recognize business oriented Metrics 434 already defined in the WSLA standard or defined in compound Metrics based upon the standard Metrics. In embodiments with a Monitor Language Extension 3462, the SLA Monitor 346 has the ability to recognize and process advanced business Metrics 434 that would not otherwise be recognized by embodiments with only a basic SLA Monitor 346. The Monitor Language Extension 3462 may include provisions for processing new Measurement Directives 438 and provisions for processing new Functions 436. New Measurement Directives 438 may include directions for measuring heterogeneous time variant cost factors, such as the cost of consumables used in the collaboration or the cost services provided. New Functions 436 may include advanced statistical analysis functions, for example a function that calculates the operational risk of pursuing a particular activity. In other embodiments, the Evaluator 344 also processes Metrics 434 and some of these embodiments include an Evaluator Language Extension 349 to allow the Evaluator 344 to recognize and process advance business Metrics 434.

Figure 2:
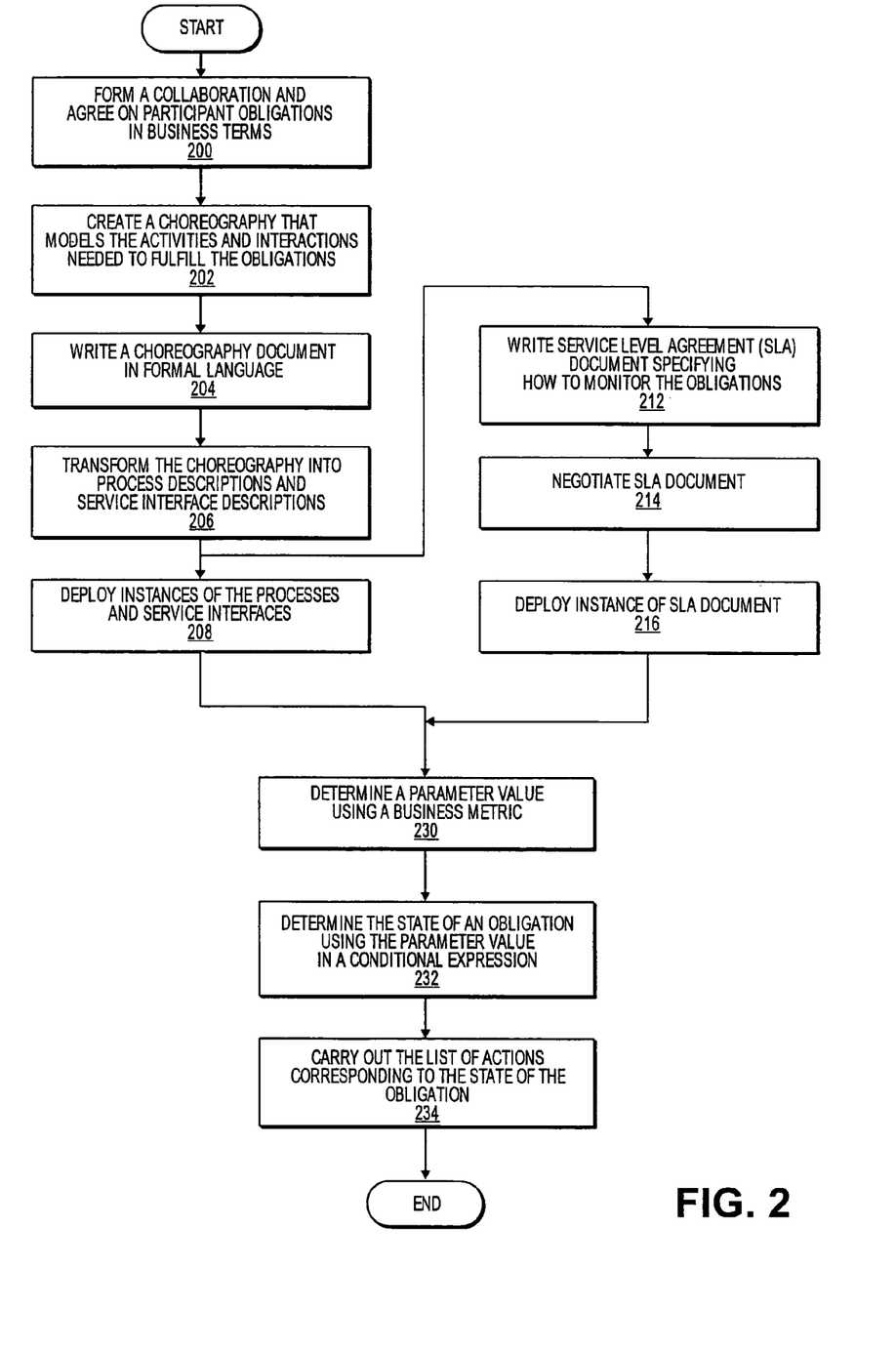
FIG. 2 is a flowchart illustrating a method for monitoring business collaborations in accordance with one exemplary embodiment of the invention.

FIG. 2 illustrates a method to formally define a collaboration and corresponding business obligations, then automatically monitor the obligations. In one embodiment, the method starts with step 200 in which the participants agree to form a collaboration and agree on participant obligations. Such an agreement may be performed by executing a business contract. The agreement specifies the objectives of the collaboration and the obligations the participants agree to take on to achieve these objectives. The obligations specify the particular participants responsible for particular activities as well as the acceptable standards for performance. These standards for performance may be made in business terms, such as the maximum cost for performing a specific activity or a calendar due date for completion of an activity or group of activities.

In step 202, the terms of the collaboration agreement are then modeled as a choreography, formally defining the roles each participant is responsible for, as well as the sequence and manner that the activities and interactions for each role are to be performed. An example of a collaboration modeled as a Unified Modeling Language (UML) activity diagram is shown in FIG. 1

In step 204, the choreography is then written into a document using a formal choreography language, such as WS-CDL. FIG. 3A shows one embodiment in which a WS-CDL Document 310 may be written using CDL Tooling 312 and an XML Editor 313. In another embodiment the WS-CDL Document 310 may be created by writing a UML model with a UML Modeler 314 that has the ability to convert UML models to CDL code.

In step 206, the choreography document is transformed into one executable business process description per role and one service interface description per role. FIG. 3A shows one embodiment where the BPEL and WSDL documents are automatically generated from a WS-CDL document with the use of a CDL to BPEL Transformer 320 such as CDL2BPEL. The BPEL Transformer 320 then transforms the WS-CDL Document 310 into multiple BPEL Process Description Documents 332-1 to 332-N, where N is the number of roles described in the choreography. The BPEL Transformer 320 also generates corresponding WSDL Service Interface Description Documents 334-1 to 334-N.

In step 208, the processes and service interfaces are deployed and executed. FIG. 3B shows one embodiment of how a single BPEL process may be deployed and executed. A BPEL Execution Engine 36, such as SAP's XI or the ActiveB-PEL engine, uses a BPEL Process Description Document 332 to create a BPEL Process Instance 362 and then execute the instance. A process instance is also referred to herein as "a process." Additionally, the BPEL Engine 336 uses the corresponding WSDL Service Interface Description Document 334 to create a Service Interface Instance 364 for each Service Interface Description 334. A Service Interface Instance is also referred to herein as "a service interface." FIG. 3C shows one embodiment with multiple BPEL process from a single collaboration deployed and executed. A BPEL Execution Engine 36-1 may deploy and execute a single BPEL Process Instance 362-1 and corresponding WSDL Service Interface Instance 364-1. In some embodiments, some of the processes related to a collaboration may be deployed and executed in other Execution Engines (see e.g. 36-2). In some embodiments, more than one process instance may be deployed in a single Execution Engine (see e.g 362-2, 362-3).

In one embodiment, steps 212-216 may be performed any time after steps 200-206 have been performed. In step 212, one or more of the participants writes a Service Level Agreement (SLA) document 316 specifying how to monitor the obligations made in step 200. The writer of the SLA document 316 describes how to monitor obligations stated in business terms. In some embodiments, these business obligations include obligations that each relate to more than one service. In some embodiments, the SLA document writer may include descriptions of business metrics. In some embodiments, the SLA Document 316 may be written in a version of Web Service Level Agreement language (WSLA).

In step 214, the SLA Document 316 is negotiated in some embodiments to confirm that the participants agree with how the SLA Document 316 specifies the obligations are to be monitored.

In step 216, the SLA Document 316 is deployed. In some embodiments, this step is performed by the SLA Manager 342 configuring an SLA Monitor 346 with one or more Service Specification 430, each creating for each a Service Specification Instance (e.g. 347-1). In some embodiments, the SLA Manager 342 also configures the SLA Evaluator with one or more Service Obligation 450, creating for each a Service Level Obligation Instances (e.g. 345-1).

In step 230, the value the Parameters 432 needed to evaluate the state of an Service Level Obligation Instances (e.g. 345-1) are determined. In some embodiments, this step is performed by the SLA Monitor 346. In other embodiments, this step is performed by the SLA Evaluator 344. In yet other embodiments both the SLA Monitor 346 and the SLA Evaluator 344 may each determine the value of some of the Parameters 432. Determining the value of a Parameter 432 is accomplished using instructions contained in the Metrics 432 of the Service Specification Instance (e.g 347-1). The instructions used may be a Function 436 or a Measurement Directive 438. Using a Function 436 returns a value based on the mathematical manipulation of values returned by other Metrics 432, creating a compound Metric 432. Using a Measurement Directive 438 returns a value by measuring a property of a Service Interface (e.g. 364-1).

In step 232, the state an obligation is determined. In one embodiment, this step may be done by the SLA Evaluator 344. For each Service Level Obligation Instance (e.g. 345-1), the SLA Evaluator 344 takes the corresponding Conditional Expression 452, takes one or more Parameter 432 as arguments, and determines the state of that Service Level Obligation Instance (e.g. 364-1).

In step 234, an Action List 454 corresponding to the state of the obligation is invoked. In one embodiment, this step may be done by the SLA Evaluator 344. The SLA Evaluator 344 will invoke the actions listed in an Action List 454 if the SLA Evaluator 344 determines the Action List 454 corresponds to the current state of Service Level Obligation Instance (e.g. 364-1). In some embodiments, the list may be empty for some obligation states, with no actions to invoke.

Another embodiment of the invention is a computerized system to carry out the steps of 200-234. Another embodiment of the invention is a machine readable medium comprising instructions which when executed by a machine, carry out the steps of 200-234. Yet another embodiment of the invention is a computer implemented method for monitoring collaborations comprising the steps of 200-234.

Although the present invention has been described with reference to specific exemplary embodiments, it will be evident that various modifications and changes may be made to these embodiments without departing from the broader spirit and scope of the invention.

APPENDIX

An example of a business oriented obligation encoded in an SLA Document. This document embodies the fourth example from the discussion of FIG. 1, where the participants agree that at any point in time during the collaboration, the fraction of the money spent divided by budget allocated must not exceed the fraction of collaboration progress towards completion.

```
<?xml version="1.0"?>
<SLA Xmlns=http://www.ibm.com/wslaC
    :xsi="http://www.w3.org/2001/XMLSchema-instance"
    xmlns:wsla="http://www.ibm.com/wsla"
    xsi:schemaLocation="c:\Projects\WSLA\wsla.xsd"
    name="sampleCMA">
<!--Specification of involved parties, here only one - the storage
partner:-->
    <Parties>
        <ServiceProvider name=http://storage.com/storage.asmx>
            <!--Action to be taken in case of violations - sending a
            notification-->
            <Action xsi:type="WSDLSOAPActionDescriptionType"
                name="Notification" partyName="storage">
                <WSDLFile>Notification.wsdl/WSDLFile>
                <SOAPBindingName>SOAPNotificationBinding
                <SOAPBindingName>
                <SOAPOperationName>Notification/SOAPOperationName>
            </Action>
        </ServiceProvider>
<!--same for the customer, the analyst-->
        <ServiceConsumer name="SOMECUSTOMER">
            <Action xsi:type="WSDLSOAPActionDescriptionType"
                name="Notification" partyName="customer">
                <WSDLFile>Notification.wsdl</WSDLFile>
                <SOAPBindingName>SOAPNotificationBinding
                </SOAPBindingName>
                <SOAPOperationName>Notify</SOAPOperationName>
            </Action>
        </ServiceConsumer>
<!--entry for the SLA monitor, in this example a service by itself-->
        <SupportingParty name="MONITOR">
            <Contact>
                <Street/>
                <City/>
            </Contact>
            <Sponsor>http://storage.com/storage.asmx<Sponsor>
            <Role>MeasurementService</Role>
        </SupportingParty>
<!--a similar entry for the SLA evaluator-->
        <SupportingParty name="EVALUATOR">
            <Contact>
                <Street/>
                <City/>
            </Contact>
            <Sponsor>SOMECUSTOMER</Sponsor>
```

-continued

```
            <Role>ConditionEvaluationService</Role>
        </SupportingParty>
    </Parties>
<!-- and here begins the part about the storage service-->
    <ServiceDefinition name="STORAGESERVICE">
        <Operation xsi:type="wsla:WSDLSOAPOperationDescriptionType"
           name="">
<!-- that's the part extended -->
<!-- Budget spent per service invocation-->
            <SLAParameter name="Invocation" type="short" unit="Euro">
                <Metric>invocation_budget</Metric>
            </SLAParameter>
<!-- Compound SLA parameter for fraction spent-->
            <SLAParameter name="fraction" type="short" unit="Euro">
                <Metric>fraction_metric</Metric>
            </SLAParameter>
<!-- and now the metrics are defined
    first the metric per service invocation, accounting for each 200
        Euro (an expensive service!) -->
            <Metric name="invocation_budget" type="short" unit="Euro">
                <Source>MONITOR</Source>
                <Function xsi:type"wsla:Plus" resultType="short">
                    <Operand>
                        <LongScalar>200</LongScalar>
                    </Operand>
                </Function>
            </Metric>
<!-- now the compound metric for the fraction of budget spent, assuming
    a planned estimate for the overall budget exists-->
            <Metric name="fraction_metric" type="short" unit="Euro">
                <Source>MONITOR</Source>
                <Function xsi:type="wsla:Divide" resultType="short">
                    <Operand>
                        <Metric>invocation_budget</Metric>
                    </Operand>
                    <Operand>
                        <LongScalar>estimated_budget</LongScalar>
                    </Operand>
                </Function>
            </Metric>
<!-- the details about when violations occur and the action needs to be
triggered-->
            <WSDLFile>SOMESERVICE.wsdl</WSDLFile>
            <SOAPBindingName>SOAPNotificationBinding
            <SOAPBindingName>
            <SOAPOperationName>someOperation</SOAPOperationName>
        </Operation>
    </ServiceDefinition>
    <Obligations>
        <ServiceLevelObjective name="OVERSPENT">
            <Obliged>http://storage.com/storage.asmx</Obliged>
            <Validity>
                <Start>2005-02-15T14:00:00</Start>
                <End>2007-06-15T14:00:00</End>
            </Validity>
            <Expression>
                <Predicate xsi:type="wsla:Greater">
                    <SLAParameter>fraction</SLAParameter>
<!-- if the fraction goes beyond 1, the budget is overspent-->
                    <Value>1<Value>
                </Predicate>
            </Expression>
            <EvaluationEvent>NewValue<EvaluationEvent>
<!--<Schedule>MainSchedule<Schedule>-->
        </ServiceLevelObjective>
        <ActionGuarantee name="g2">
            <Obliged>EVALUATOR</Obliged>
    </Obligations>
</SLA>
```

What is claimed is:

1. A system comprising:

an execution engine running on a computing device to generate and execute a process that is part of a collaboration, and a corresponding service interface that provides services for execution of the process for every role described in the collaboration, each service interface having a property that is measurable using a measurement directive;

a manager, in a service level agreement (SLA) sub-system running on the computing device, to deploy a SLA document, the SLA document having a parameter defined by a metric, the metric for determining a value of the parameter using a function having arguments that include other metrics, and for measuring the properties of the service interfaces using the measurement directive for each one of the services for execution of the process, an obligation regarding a performance of the collaboration, the obligation stated in business terms, and a conditional expression that defines a state of the obligation, including a list of actions that correspond to the state of the obligation, wherein every role described in the collaboration specifies one or more actions in the list of actions that a party assuming the role is obligated to perform during the performance of the collaboration;

a monitor, in the SLA sub-system running on the computing device, communicatively coupled to the manager to:

determine the value of the parameter based, at least in part, on instructions contained in the metric using the function having arguments that include other metrics, measure the properties of the service interfaces based, at least in part, on the measurement directive, the measurement directive including an instruction to measure the property of the service interface for each one of the services for execution of the process, wherein the measurement directive is bound with a service operation link that indicates a location of the service interface, the location including locations that are remote from the monitor; and an evaluator, in the SLA sub-system running on the computing device, communicatively coupled to the monitor to determine the state of the obligation by evaluating the conditional expression based, at least in part, on the determined value of the parameter of the SLA document, the measurements of the properties of each of the service interfaces, and the indicated location of the service interface for each one of the services for execution of the process.

2. The system of claim 1, wherein the metric further comprises a business metric.

3. The system of claim 1, wherein the evaluator invokes the list of actions corresponding with the state of the obligation, including identifying the role specifying the one or more actions in the list of actions that the party assuming the role is obligated to perform during the performance of the collaboration.

4. The system of claim 1, wherein the monitor is coupled with an observational component extension to allow the monitor to measure the properties of a plurality of remote service interfaces executing at locations remote from the monitor.

5. The system of claim 2, wherein the monitor is coupled with a language extension to allow the monitor to process business metrics.

6. The system of claim 1, wherein the evaluator is coupled with a language extension to allow the evaluator to process obligations stated in business terms.

7. The system of claim 6, wherein the business terms of the obligation include terms regarding a cost of goods or services.

8. The system of claim 7, wherein the business terms of the obligation include terms regarding a time to complete an activity requiring services from a plurality of participants in the collaboration.

9. The system of claim 2, wherein the business metric includes a description of measuring a cost of goods or services related to the collaboration.

10. The system of claim 2, wherein the business metric includes a description of calculating a business function, the business function including a statistical analysis function.

11. The system of claim 10, wherein the business function includes an operational risk function.

12. The system of claim 1, wherein the services provided for the process by the service interfaces is selected from the group consisting of generation, manipulation and exchange of a message.

13. A method comprising:
generating, via an execution engine running on a computing device, a process and a corresponding service interface for every role described in a collaboration, each service interface having a property that is measurable using a measurement directive, the process being a part of the collaboration;
deploying, via the execution engine, the process to carry out part of the collaboration;
deploying, via the execution engine, service interfaces to provide services for the process;
deploying, via a service level agreement (SLA) sub-system running on the computing device, a description of an obligation regarding performance of the collaboration, stated in business terms, including a conditional expression that defines a state of the obligation, wherein the conditional expression includes a list of actions that correspond to the state of the obligation, wherein every role described in the collaboration specifies one or more actions in the list of actions that a party assuming the role is obligated to perform during the performance of the collaboration, a parameter, and a metric for determining a value of the parameter using a function having arguments that include other metrics, and for measuring the properties of the service interfaces using the measurement directive for each one of the services provided for the process;
determine, via the SLA sub-system running on the computing device;
the value of the parameter using the metric based, at least in part, on instructions contained in the metric for using the function having arguments that include other metrics, and
a measurement of the property of the service interface based, at least in part, on instructions contained in the metric for using the measurement directive, including an instruction to measure the property of the service interface, wherein the measurement directive is bound with a service operation link that indicates a location of the service interface, the location including locations that are remote from the SLA sub-system; and
evaluating, via the SLA sub-system running on the computing device, the state of the obligation using the conditional expression based, at least in part, on the value of the parameter of the SLA document, the measurements of the properties of each of the service interfaces, and the location of the service interface for each one of the services provided for the process.

14. The method of claim 13, wherein the metric further comprises a business metric.

15. The method of claim 13, further comprising the steps of:
identifying, via the SLA sub-system running on the computing device, the role specifying the one or more actions in the list of actions that the party assuming the role is obligated to perform during the performance of the collaboration; and
carrying out actions corresponding to the state of the obligation in accordance with the identified role.

16. The method of claim 13, wherein the business terms of the obligation include terms regarding a cost of goods or services.

17. The method of claim 13, wherein the business terms of the obligation include terms regarding a time to complete an activity requiring services from a plurality of participants in the collaboration.

18. The method of claim 14, wherein the business metric includes instructions to measure a time variant cost factor.

19. The method of claim 14, wherein the business metric includes instructions to calculate at least one business function, the business function including a statistical analysis function.

20. The method of claim 14, wherein the business function includes at least one operational risk formula.

21. An article of manufacture comprising:
a non-transitory machine-readable medium having stored thereon instructions, which when executed by a machine, cause the machine to perform a method comprising:
generating a process and a corresponding service interface that provides services for execution of the process for every role described in a collaboration, the service interface having a property that is measurable using a measurement directive, the process being a part of the collaboration;
deploying the process to carry out part of the collaboration;
deploying service interfaces to provide services for the process;
deploying a description of an obligation regarding performance of the collaboration, stated in business terms, including a conditional expression that defines a state of the obligation, wherein the conditional expression includes a list of actions that correspond to the state of the obligation, wherein every role described in the collaboration specifies one or more actions in the list of actions that a party assuming the role is obligated to perform during the performance of the collaboration, a parameter, and a business metric for determining a value of the parameter using a function having arguments that include other metrics, and for measuring a property of the service interfaces using the measurement directive for each one of the services provided for the process;
determining:
the value of the parameter using the business metric, based at least in part on instructions contained in the business metric for using the function having arguments that include other metrics, and a measurement of the properties of the service interfaces based, at least in part, on instructions contained in the business metric for using the measurement directive, including an instruction to measure the property of the service interface, wherein the measurement directive is bound with a service operation link that indicates a location of the service interface, the location including locations that are remote from the process deployment; and
evaluating the state of the obligation using the conditional expression based, at least in part, on the value of the parameter, the measurements of the properties of each of the service interfaces, and the location of the service interface for each one of the services provided for the process.

* * * * *